United States Patent
Wang et al.

(10) Patent No.: US 7,600,066 B2
(45) Date of Patent: Oct. 6, 2009

(54) METHODS FOR IDENTIFYING BRIDGE DEVICES AND SYSTEMS THEREOF

(75) Inventors: Jar-Haur Wang, Taipei (TW); Hung-Chou Hsu, Taipei (TW)

(73) Assignee: Via Technologies, Inc., Taipei (TW)

( * ) Notice: Subject to any disclaimer, the term of this patent is extended or adjusted under 35 U.S.C. 154(b) by 139 days.

(21) Appl. No.: 11/608,514

(22) Filed: Dec. 8, 2006

(65) Prior Publication Data

US 2007/0192522 A1    Aug. 16, 2007

(30) Foreign Application Priority Data

Feb. 10, 2006   (TW) ............................... 95104608 A

(51) Int. Cl.
   *G06F 13/36*   (2006.01)
(52) U.S. Cl. .......................................... 710/306; 710/8
(58) Field of Classification Search .................. 710/8, 710/10, 305, 306; 714/718, 741
   See application file for complete search history.

(56) References Cited

U.S. PATENT DOCUMENTS

| | | | |
|---|---|---|---|
| 6,199,122 B1 * | 3/2001 | Kobayashi | 710/36 |
| 6,618,788 B1 * | 9/2003 | Jacobs | 710/315 |
| 7,010,638 B2 * | 3/2006 | Deng et al. | 710/306 |
| 7,047,460 B1 * | 5/2006 | Schofield | 714/718 |
| 7,058,748 B1 * | 6/2006 | Jacobs et al. | 710/311 |
| 7,159,065 B1 * | 1/2007 | Marlatt | 710/313 |

* cited by examiner

*Primary Examiner*—Khanh Dang
(74) *Attorney, Agent, or Firm*—Thomas, Kayden, Horstemeyer & Risley

(57) ABSTRACT

Methods for identifying bridge devices and systems thereof. A bridge device receives an undefined command. In response to the undefined command, output information comprising at least one no-available parameter is generated. The bridge device sets the no-available parameter as a predetermined value. The bridge device is identified by determining whether a predetermined value of at least one no-available parameter in the output information matches a predefined value for a supported bridge device.

13 Claims, 5 Drawing Sheets

| Register | 7 | 6 | 5 | 4 | 3 | 2 | 1 | 0 |
|---|---|---|---|---|---|---|---|---|
| Error | na | na | na | na | na | ABRT | na | na |
| Sector Count | na | | | | | | | |
| LBA Low | na | | | | | | | |
| LBA Mid | na | | | | | | | |
| LBA High | na | | | | | | | |
| Device | obs | na | obs | DEV | na | | | |
| Status | BSY | DRDY | DF | na | DRQ | na | na | ERR |

FIG. 2A

| Register | 7 | 6 | 5 | 4 | 3 | 2 | 1 | 0 |
|---|---|---|---|---|---|---|---|---|
| Error | na | na | na | na | na | ABRT | na | na |
| Sector Count | | | | 01h | | | | |
| LBA Low | | | | 02h | | | | |
| LBA Mid | | | | 03h | | | | |
| LBA High | | | | 04h | | | | |
| Device | obs | na | obs | DEV | | na | | |
| Status | BSY | DRDY | DF | na | DRQ | na | na | ERR |

FIG. 2B

METHODS FOR IDENTIFYING BRIDGE DEVICES AND SYSTEMS THEREOF

BACKGROUND OF THE INVENTION

1. Field of the Invention

The disclosure relates generally to device identification, and, more particularly to methods for identifying bridge devices and systems thereof.

2. Description of the Related Art

Computer systems are coupled with several standard interface devices, such as hard disks, CD-ROM drives, floppy disk drives, and others for storing and managing data, and performing related applications. These standard interface devices couple to the computer systems via standard interfaces, such as ATA (Advanced Technology Attachment), ATAPI (AT Attachment Packet Interface), and SATA (Serial Advanced Technology Attachment) interfaces.

In computer systems, a standard interface device couples to a host controller via a bridge device. When a command for the standard interface to perform an action is generated, the command is transmitted to the bridge device by a software program. The bridge device then transforms the command into a specific format understood by the standard interface device, and transmits the command to the standard interface device. Once receiving the command, the standard interface device performs the command, generates output information, and returns the output information to the host controller via the bridge device. Similarly, the bridge device must transform the output information into a format understood by the host controller.

Generally, the bridge devices must be tested to ensure corresponding functions, and respective manufacturers develop their software programs for the testing. Currently, two standard commands including "IDENTIFY DEVICE" and "IDENTIFY PACKET DEVICE" are provided to retrieve related information of standard interface devices coupled with the bridge devices, and identify the standard interface devices accordingly. However, no mechanism for identifying bridge devices is provided. In some cases, the software program developed by one manufacturer can be easily misappropriated by other manufacturerd without authorization.

BRIEF SUMMARY OF THE INVENTION

Methods for identifying bridge devices and systems thereof are provided.

In an embodiment of a method for identifying bridge devices, a bridge device receives an undefined command. In response to the undefined command, output information comprising at least one no-available parameter is generated. The bridge device sets the no-available parameter as a predetermined value. The bridge device is identified according to the output information.

An embodiment of a system for identifying bridge devices comprises a bridge device. The bridge device comprises output information corresponding to an undefined command. The output information comprises at least one no-available parameter. The bridge device sets the no-available parameters as a predetermined value. The bridge device is identified according to the output information.

An embodiment of a system for identifying bridge devices comprises an application. The application generates and transmits an undefined command to a bridge device, and receives output information corresponding to the undefined command from the bridge device. The application identifies the bridge device by determining whether a predetermined value of at least one no-available parameter in the output information matches a predefined value for a supported bridge device.

In an embodiment of a method for identifying bridge devices, an undefined command is generated and transmitted to a bridge device, and output information corresponding to the undefined command is received from the bridge device. The bridge device is identified by determining whether a predetermined value of at least one no-available parameter in the output information matches a predefined value for a supported bridge device.

Methods for identifying bridge devices and systems thereof may take the form of program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein:

FIG. 2A is a schematic diagram illustrating an embodiment of output information corresponding to an undefined command;

FIG. 2B is a schematic diagram illustrating an embodiment of output information with setting on no-available parameters;

DETAILED DESCRIPTION OF THE INVENTION

Methods for identifying bridge devices and systems thereof are provided.

Figure 1:
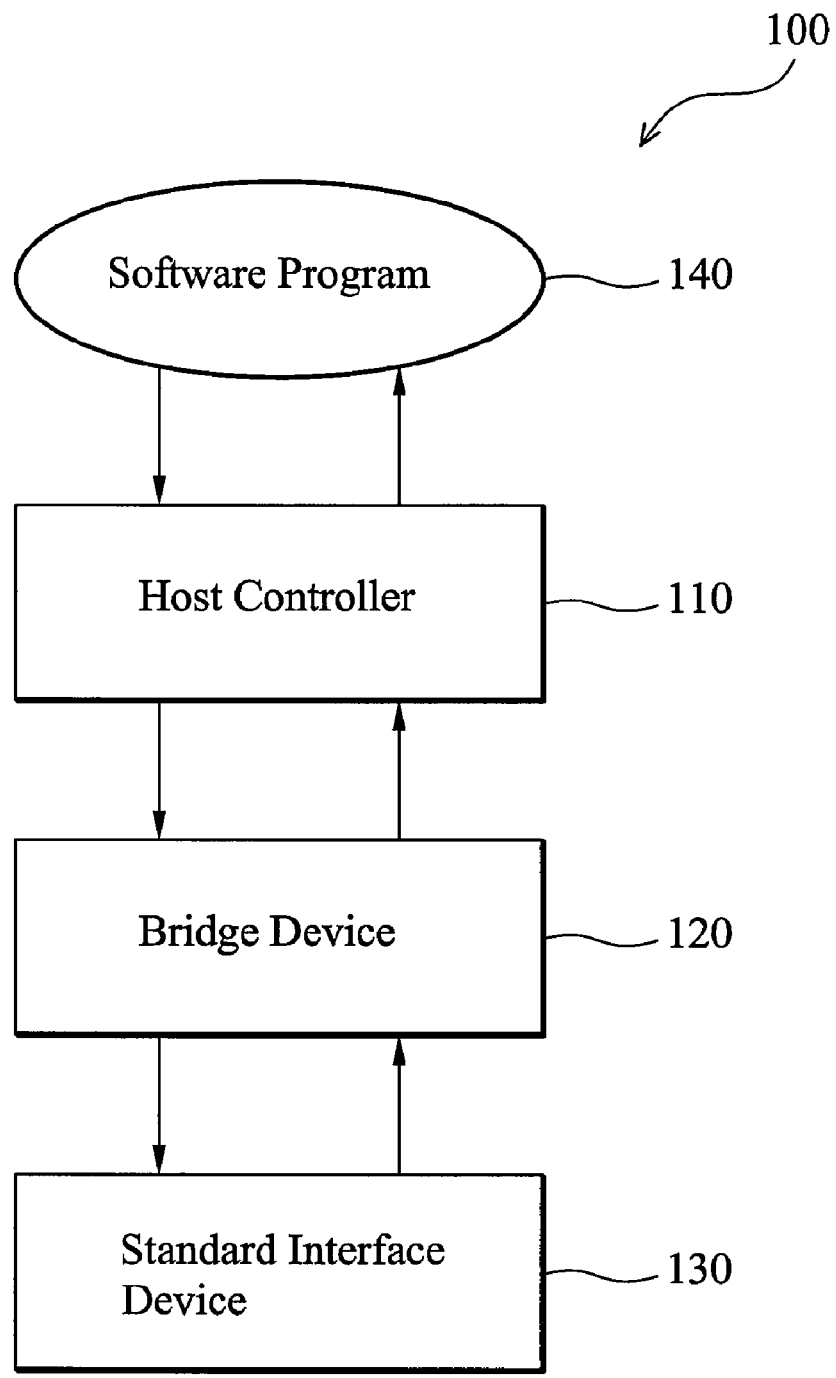
FIG. 1 is a schematic diagram illustrating an embodiment of a system for identifying bridge devices.

FIG. 1 is a schematic diagram illustrating an embodiment of a system for identifying bridge devices.

The system 100 may be a computer system comprising a host controller 110, a bridge device 120, and a standard interface device 130. The standard interface device 130 couples to the host controller 110 via the bridge device 120 via standard interfaces, such as ATA, ATAPI, and SATA interfaces. An application such as a software program 140 generates and outputs commands to the host controller 110. The application is used for testing the functionality of the bridge device 120 and/or the standard interface device 130. The bridge device 120 transmits data and transforms data format between the host controller 110 and the standard interface device 130. For example, the bridge device 120 transforms a command received from the host controller 110 into a format understood by the standard interface device 130, and transmits the transformed command to the standard interface device 130. The standard interface device 130 performs the command, generates output information, and transmits the output information to the bridge device 120. The bridge device 120 then transforms the output information into a format understood by the host controller 110, and transmits it to the host controller 110. The detail of the bridge device 120 is discussed later.

As described, output information is generated and recorded into a plurality of registers of the standard interface device 130 after a command is performed, and the status of the standard interface device 130 after performing the command can be determined accordingly. If an undefined command is input to the standard interface device 130, output information representing an execution failure is generated since the standard interface device 130 cannot recognize the undefined command. The output information also identifies the undefined command as unrecognizable. FIG. 2A is a schematic diagram illustrating an embodiment of output information corresponding to an undefined command. As shown in FIG. 2A, the output information comprises a plurality of output parameters comprising Error, Sector Count, LBA Low, LBA Mid, LBA High, Device, and Status register parameters.

When the standard interface device 130 performs an undefined command, resulting in execution failure, Bit 2 ("ABRT") of an Error register corresponding to the Error register parameter is set as 1, representing execution failure in the standard interface device 130, where "ABRT" is a failure parameter. Other bits of the Error register are na (no-available) output parameters, of any value. The Sector Count, LBA Low, LBA Mid, and LBA High register parameters are also na output parameters in the output information corresponding to an undefined command, and the standard interface device 130 can fill any value in corresponding registers. Additionally, Bit 4, 5, and 7 of a Device register corresponding to the Device register parameter are set as "DEV", "obs", and "obs", and other bits of the Device register are na output parameters, of any value. Bit 0 ("ERR") of a Status register corresponding to the Status register parameter is set as 1, representing execution failure in the standard interface device 130, where "ERR" is an error parameter. Bit 3, 5, 6, and 7 of the Status register are set as "DRQ", "DF", "DRDY", and "BSY", and other bits of the Status register are na output parameters, being any value.

Figure 3:
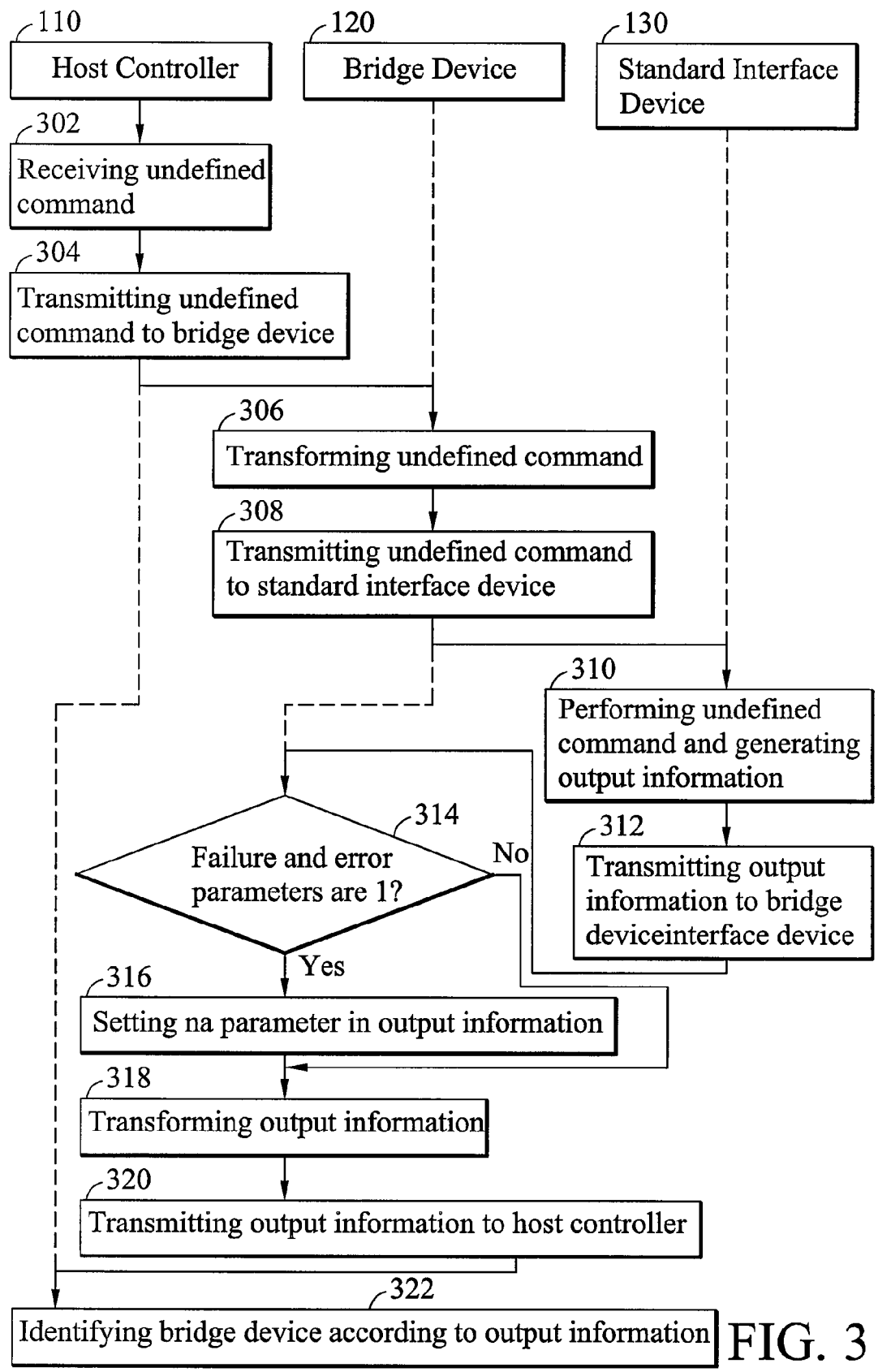
FIG. 3 is a flowchart of an embodiment of a method for identifying bridge devices.

FIG. 3 is a flowchart of an embodiment of a method for identifying bridge devices.

In step S302, the host controller 110 receives an undefined command. It is understood that the undefined command can be generated by an application such as the software program 140. The undefined command can be recognized by the bridge device 120, but not recognized by the standard interface device 130. In step S304, the host controller 110 transmits the undefined command to the bridge device 120. In step S306, the bridge device 120 transforms the undefined command into a format understood by the standard interface device 130, and in step S308, transmits the transformed undefined command to the standard interface device 130. In step S310, the standard interface device 130 performs the undefined command, and generates output information accordingly. Since the undefined command cannot be recognized by the standard interface device 130, the execution corresponding to the undefined command fails, and the output information indicates the execution failure, as shown in FIG. 2A. In step S312, the output information is transmitted to the bridge device 120. It is understood that the output parameters in the output information are also recorded in the corresponding registers.

After receiving the output information, in step S314, the bridge device 120 determines whether the failure parameter (ABRT) equals 1, and the error parameter (ERR) equals 1. If not (No in step S314), the procedure goes to step S318. If so (Yes in step S314), in step S316, the bridge device 120 sets the na parameters in the output information as predetermined values. FIG. 2B is a schematic diagram illustrating an embodiment of output information with setting on no-available parameters. As shown in FIG. 2B, the na parameters in the output information comprise Sector Count, LBA Low, LBA Mid, and LBA High register parameters. In this embodiment, the bridge device 120 sets the Sector Count, LBA Low, LBA Mid, and LBA High register parameters as "01 h", "02 h", "03 h", and "04 h", respectively. It is understood that the selected na parameters for setting, and the corresponding predetermined values are examples, although the disclosure is not limited thereto. After setting the na parameters in the output information, in step S318, the bridge device 120 transforms the output information into a format understood by the host controller 110, and in step S320, transmits the output information to the host controller 110. In step S322, the host controller 110 identifies the bridge device 120 according to the output information. Additionally, the software program 140 can read the output information from the host controller 110 and identify the bridge device 120 accordingly. It is noted that the predetermined values of the na output parameters corresponding to the bridge device 120 are provided in the host controller 110 and/or the software program 140. To identify the bridge device is to determine whether the value of the no-available parameter matches the predetermined value corresponding to the bridge device. If the Sector Count, LBA Low, LBA Mid, and LBA High register parameters are "01 h", "02 h", "03 h", and "04 h", respectively, the bridge device 120 is a supported device. In one case, the software program 140 can continue subsequent bridge device testing. If the Sector Count, LBA Low, LBA Mid, and LBA High register parameters are not "01 h", "02 h", "03 h", and "04 h", respectively, the bridge device 120 is not a supported device, and the software program 140 terminates.

In some embodiments, if the undefined command is recognized by the bridge device 120, but not recognized by the standard interface device 130, the bridge device 120 can determine whether the undefined command cannot be recognized by the standard interface device 130. If so, the bridge device 120 can directly generate the output information rather than transmitting the undefined command to the standard interface device 130.

Figure 4:
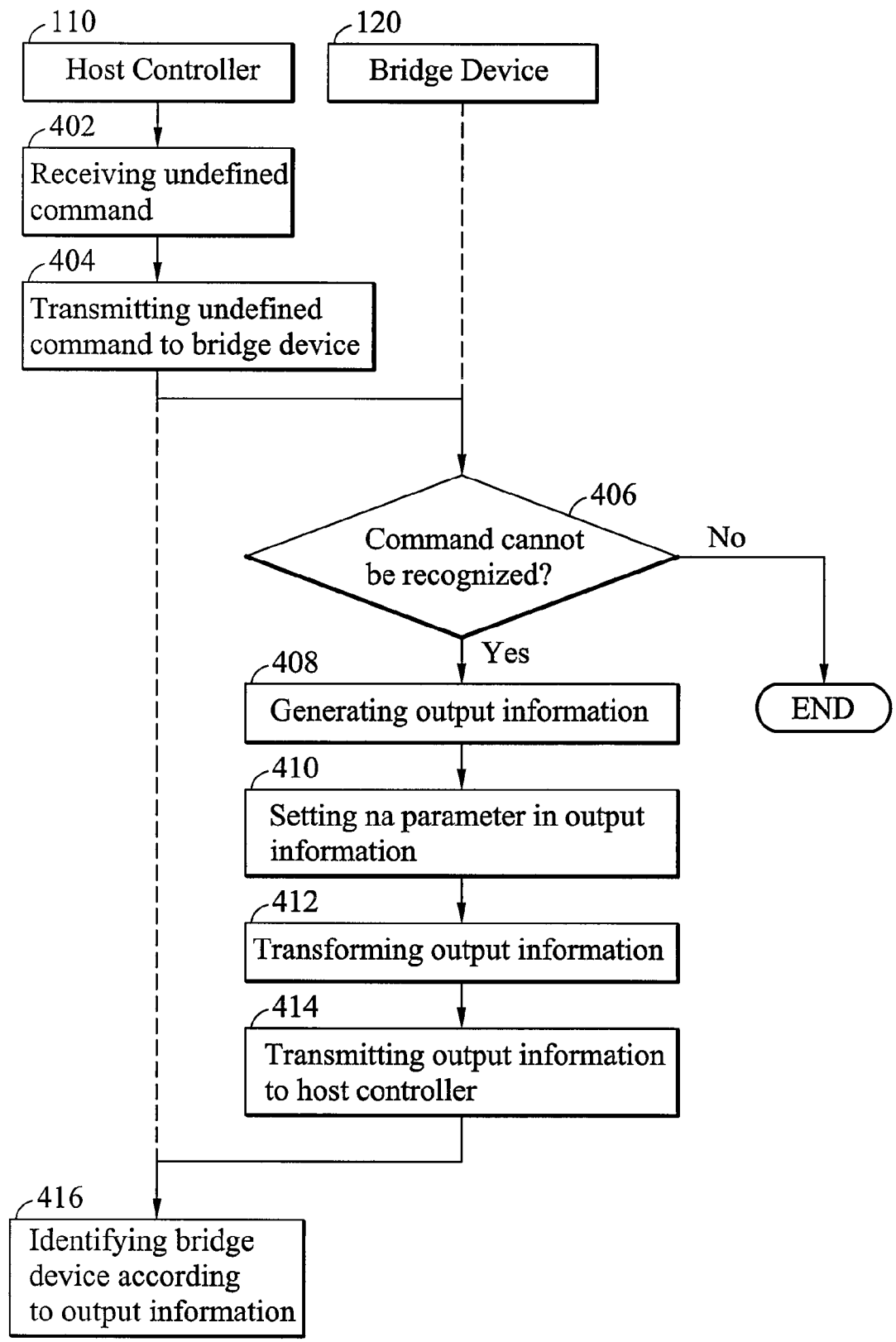
FIG. 4 is a flowchart of an embodiment of a method for identifying bridge devices.

FIG. 4 is a flowchart of an embodiment of a method for identifying bridge devices. In this embodiment, an undefined command can be generated by an application such as the software program 140. The undefined command cannot be recognized by the bridge device 120 and the standard interface device 130.

In step S402, the host controller 110 receives the undefined command. In step S404, the host controller 110 transmits the undefined command to the bridge device 120. In step S406, the bridge device 120 determines whether the undefined command is recognized. If not (No in step S406), the procedure is complete. If so (Yes in step S406), in step S408, the bridge device 120 generates output information indicating the command cannot be recognized. It is understood that the output information is similar to that generated in FIG. 3, indicating execution failure, as shown in FIG. 2A. In step S410, the bridge device 120 sets the na parameters in the output information as predetermined values, as shown in FIG. 2B. Similarly, the selected na parameters for setting, and the corresponding predetermined values in FIG. 2B are examples, although the disclosure is not limited thereto. After setting the na parameters in the output information, in step S412, the bridge device 120 transforms the output information into a format understood by the host controller 110, and in step S414, transmits the output information to the host controller 110. In step S416, the host controller 110 identifies the bridge device 120 according to the output information. Also, the software program 140 can read the output information from the host controller 110 and identify the bridge device 120 accordingly. If the Sector Count, LBA Low, LBA Mid, and LBA High register parameters are "01 h", "02 h", "03 h", and "04 h", respectively, the bridge device 120 is a supported device. In one case, the software program 140 can continue subsequent bridge device testing. If the Sector Count, LBA Low, LBA Mid, and LBA High register parameters are not "01 h", "02 h", "03 h", and "04 h", respectively, the bridge device 120 is not a supported device, and the software program 140 terminates.

The bridge device has predetermined values for setting the na parameters in the output information. The software program and/or the host controller can determine whether the na parameters in the received output information have the same predetermined values corresponding to the bridge device, thereby identifying the bridge device.

Methods for identifying bridge devices and systems thereof, or certain aspects or portions thereof, may take the form of program code (i.e., executable instructions) embodied in tangible media, such as products, floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A method for identifying bridge devices, comprising:
   receiving an undefined command by a bridge device from a host controller, wherein the undefined command is undefined to the bridge device or a standard interface device;
   transmitting the undefined command to the standard interface device by the bridge device;
   performing the undefined command by the standard interface device to generate output information comprising at least one specific parameter in response to the undefined command, wherein the specific parameter has an any value;
   transmitting the output information to the bridge device by the standard interface device;
   setting the specific parameter in the output information from the any value to a specific value by the bridge device;
   transmitting the output information that has been set by the bridge device to the host controller by the bridge device;
   identifying the bridge device by the host controller or an application according to the output information that has been set by the bridge device by determining whether the specific value of the specific parameter matches a predetermined value of a specific supported bridge device.

2. The method of claim 1 further comprising:
   transforming the output information by the bridge device into a format understood by the host controller, and transmitting the transformed output information to the host controller.

3. The method of claim 1 further comprising:
   determining whether the undefined command is recognized by the bridge device; and
   if not, generating the output information by the bridge device.

4. The method of claim 1 further comprising:
   determining whether the undefined command is recognized by the standard interface device by the bridge device; and
   if not, directly generating the output information by the bridge device.

5. The method of claim 1 further comprising transforming the undefined command by the bridge device into a format understood by the standard interface device.

6. The method of claim 1 further comprising determining whether failure and error parameters in the output information are true by the bridge device, and setting the specific parameter accordingly.

7. The method of claim 1 further comprising terminating if the specific value of the specific parameter does not match the predetermined value corresponding to the supported bridge device.

8. A system for identifying bridge devices, comprising:
   a standard interface device;
   a host controller transmitting an undefined command; and
   a bridge device receiving the undefined command from the host controller, wherein the undefined command is undefined to the bridge device or the standard interface device, transmitting the undefined command to the standard interface device, and receiving output information comprising at least one specific parameter corresponding to an undefined command from the standard interface device, wherein the standard interface device performs the undefined command to generate the output information, and the specific parameter has an any value, setting the specific parameter in the output information from the any value to a specific value, and transmitting the output information that has been set by the bridge device to the host controller,
   wherein the host controller or an application identifies the bridge device according to the output information that has been set by the bridge device by determining whether the specific value of the specific parameter matches a predetermined value of a specific supported bridge device.

9. The system of claim 8 wherein the bridge device further transforms the output information into a format understood by the host controller, and transmits the transformed output information to the host controller.

10. The system of claim 8 wherein the bridge device further determines whether the undefined command is recognized by the standard interface device, and if not, directly generates the output information.

11. The system of claim 8 wherein the bridge device further transforms the undefined command into a format understood by the standard interface device.

12. The system of claim 8 wherein the bridge device further determines whether failure and error parameters in the output information are true, and sets the specific parameter accordingly.

13. The system of claim 8 further comprising the application terminating if the specific value of the specific parameter does not match the predetermined value corresponding to the supported bridge device.

* * * * *